(12) United States Patent  
Zhao et al.

(10) Patent No.: US 8,706,340 B2  
(45) Date of Patent: Apr. 22, 2014

(54) UNDERGROUND UTILITY VAULT INSPECTION SYSTEM AND METHOD

(75) Inventors: Tiebin Zhao, Charlotte, NC (US); Andrew John Phillips, Harrisburg, NC (US); Steven Wallace Eckroad, Charlotte, NC (US)

(73) Assignee: Electric Power Research Institute, Inc., Charlotte, NC (US)

( * ) Notice: Subject to any disclaimer, the term of this patent is extended or adjusted under 35 U.S.C. 154(b) by 4 days.

(21) Appl. No.: 13/430,139

(22) Filed: Mar. 26, 2012

(65) Prior Publication Data

US 2012/0271501 A1    Oct. 25, 2012

Related U.S. Application Data

(60) Provisional application No. 61/476,923, filed on Apr. 19, 2011.

(51) Int. Cl.
```
G05D 1/00        (2006.01)
G03B 37/00       (2006.01)
B61B 13/10       (2006.01)
```

(52) U.S. Cl.
    CPC ............. *G03B 37/00* (2013.01); *G03B 37/005* (2013.01); *B61B 13/10* (2013.01); *Y10S 901/44* (2013.01); *Y10S 901/01* (2013.01)
    USPC .................................... 701/25; 901/44; 901/1

(58) Field of Classification Search
    CPC ....... G03B 37/00; G03B 37/005; B61B 13/10
    USPC ............... 701/25, 24; 180/167, 6.5, 6.58, 8.2, 180/9.32; 348/118, 82, E7.088; 901/1
    See application file for complete search history.

(56) References Cited

U.S. PATENT DOCUMENTS

| | | | |
|---|---|---|---|
| 4,194,218 A | | 3/1980 | Hasegawa |
| 4,559,881 A | * | 12/1985 | Lankard et al. ................. 109/83 |
| 4,567,514 A | | 1/1986 | Morgan |
| 4,616,258 A | | 10/1986 | Ono |
| 4,661,308 A | * | 4/1987 | Takenaka ...................... 376/245 |
| 4,888,706 A | * | 12/1989 | Rush et al. .................... 700/283 |
| 5,103,739 A | | 4/1992 | Sawada |
| 5,350,033 A | * | 9/1994 | Kraft ............................. 180/167 |
| 5,660,202 A | | 8/1997 | Rush, Jr. |
| 5,963,033 A | | 10/1999 | Booker |
| 6,285,919 B1 | | 9/2001 | Randolph |
| 6,505,525 B2 | | 1/2003 | McGrew |
| 6,887,014 B2 | | 5/2005 | Holland |
| 6,889,783 B1 | | 5/2005 | Moore |
| 7,131,344 B2 | | 11/2006 | Tarumi |

(Continued)

FOREIGN PATENT DOCUMENTS

| | | | |
|---|---|---|---|
| EP | 1873535 | | 1/2008 |
| GB | 002091790 | * | 8/1998 ............. E01B 23/04 |
| JP | 2055506 | | 2/1990 |
| JP | 3235605 | | 10/1991 |

(Continued)

*Primary Examiner* — Marthe Marc-Coleman

(74) *Attorney, Agent, or Firm* — Trego, Hines & Ladenheim, PLLC

(57) ABSTRACT

An underground utility vault inspection system and method includes a pre-defined railway installed in an underground utility vault, and an inspection vehicle adapted to traverse the railway to provide inspection results to inspection personnel. The inspection vehicle includes inspection tools for inspecting underground power lines and equipment, recording inspection results, and transmitting the inspection results to the inspection personnel.

16 Claims, 6 Drawing Sheets

(56) References Cited

U.S. PATENT DOCUMENTS

| | | | |
|---|---|---|---|
| 7,480,041 B2 | 1/2009 | Lindner | |
| 7,496,459 B2 | 2/2009 | McAllister | |
| 8,190,377 B2 * | 5/2012 | Fu et al. ........................ | 702/34 |
| 2001/0001537 A1 | 5/2001 | Mcnulty | |
| 2002/0125216 A1 * | 9/2002 | Sauron et al. .................. | 219/54 |
| 2005/0007057 A1 * | 1/2005 | Peless et al. .................. | 318/580 |
| 2006/0114122 A1 | 6/2006 | Jones | |
| 2007/0109404 A1 | 5/2007 | Lortie | |
| 2007/0210192 A1 * | 9/2007 | Piatti ............................ | 239/750 |

FOREIGN PATENT DOCUMENTS

| | | |
|---|---|---|
| JP | 6265084 | 9/1994 |
| JP | 7015820 | 1/1995 |
| JP | 10032908 | 2/1998 |
| JP | 10191517 | 7/1998 |
| JP | 2002228433 | 8/2002 |
| JP | 2003009326 | 1/2003 |
| JP | 2004023824 | 1/2004 |
| JP | 2004242476 | 8/2004 |
| JP | 2006090722 | 4/2006 |
| JP | 2006254567 | 9/2006 |

\* cited by examiner

UNDERGROUND UTILITY VAULT INSPECTION SYSTEM AND METHOD

This application claims the benefit of Provisional Application No. 61/476,923 filed on Apr. 19, 2011.

BACKGROUND OF THE INVENTION

The present invention relates generally to an inspection system and method for underground power line inspection.

Underground power lines require inspection and maintenance to ensure long-term performance and reliable operations. Inspection and maintenance access is typically obtained through vaults (manholes) or tunnels, FIGS. 1-5, through which the lines run. Conventional inspection practices often involve human entry to the vault or tunnel and require utility personnel to have direct access to the line components for visual inspection and/or necessary measurements using portable instruments, FIGS. 6 and 7. However, certain sections of the underground lines may be difficult to access or there may be restrictions to get access which may require taking the entire circuit out of service and/or entail significant personnel safety hazards. Examples include components in underground splice vaults where the space is confined with potential hazards.

Entering a confined space with potential hazards is restricted by many electric utilities. As a result, inspection personnel cannot easily or safely access certain sections of underground power lines. In many occasions, getting access to those sections or areas is costly. For example, line outages are required by many utilities for personnel to enter an underground vault for inspection. In some instances, inspection for these areas may be performed with the assistance of extension sticks or moving carts. However, such inspection methods can be limited and difficult to standardize.

Under a limited scope, inspection may also be performed using remote sensing. In this sensing technology, sensors are fixed at specific locations adjacent to or near the components to be inspected. The measurements are then made, and data retrieved and processed on site or transferred to a remote location. However, because remote sensing devices, if used, are fixed at specific locations within the vaults, they may not have full view of all components, thereby limiting the effectiveness of the inspection.

Accordingly, there is a need for an underground power line vault inspection system and method that allows complete inspection of an underground power line without compromising personnel safety or performing a costly line outage.

BRIEF SUMMARY OF THE INVENTION

These and other shortcomings of the prior art are addressed by the present invention, which provides a system and method for the inspection of underground power lines running through a vault or tunnel.

According to one aspect of the invention, an underground utility vault inspection system includes a pre-defined railway installed in an underground utility vault; and an inspection vehicle adapted to traverse the railway to provide inspection results to inspection personnel. The inspection vehicle includes inspection tools for inspecting underground power lines and equipment, recording inspection results, and transmitting the inspection results to the inspection personnel.

According to another aspect of the invention, a method for inspecting underground utility vaults includes the steps of providing an inspection vehicle adapted to traverse a railway disposed in an underground utility vault; moving the inspection vehicle to a pre-determined location in the utility vault; and using the inspection vehicle to inspect utilities located in the utility vault.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
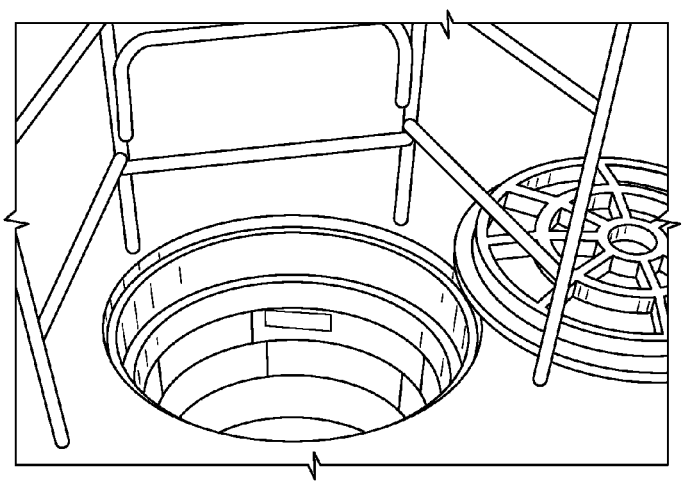
FIGS. 1 and 2 show an entrance to an underground power line vault.
Figure 2:
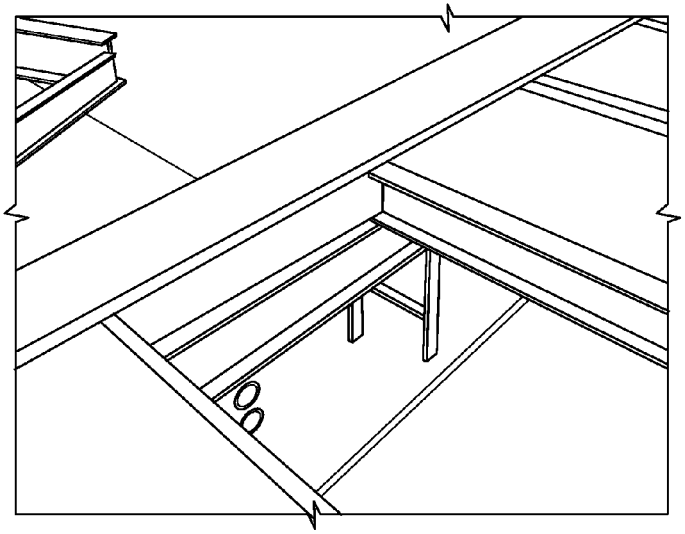
Figure 3:
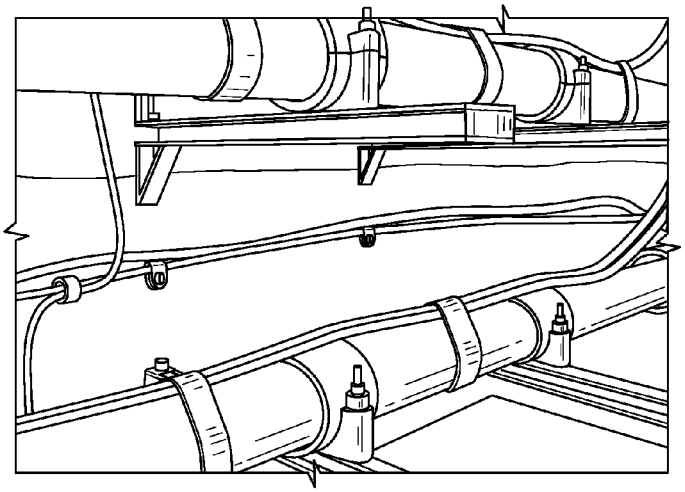
FIGS. 3-5 show an inside of an underground power line vault.
Figure 4:
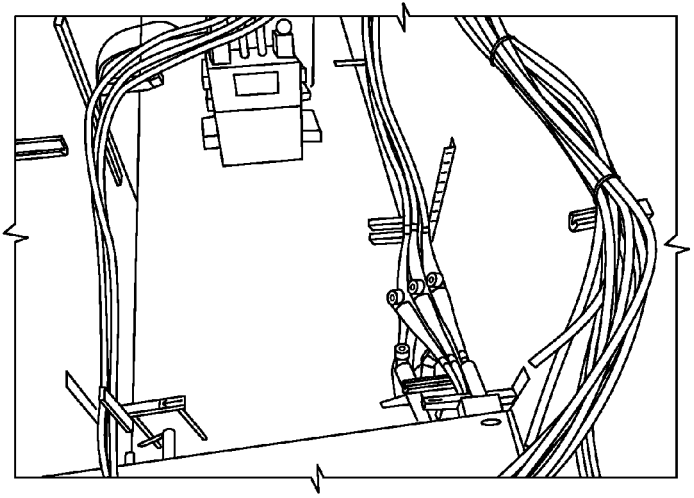
Figure 5:
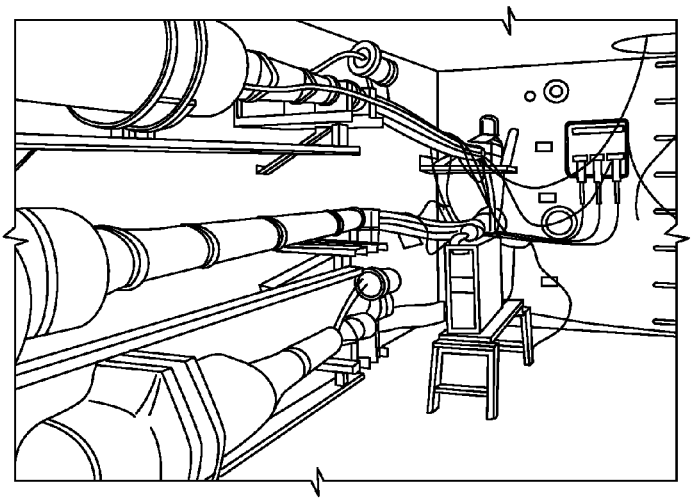
Figure 6:
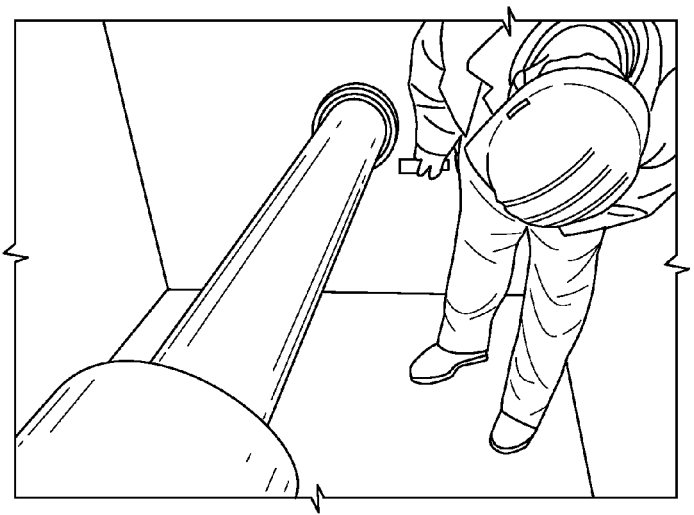
FIGS. 6 and 7 show individuals performing visual inspection of underground power lines.
Figure 7:
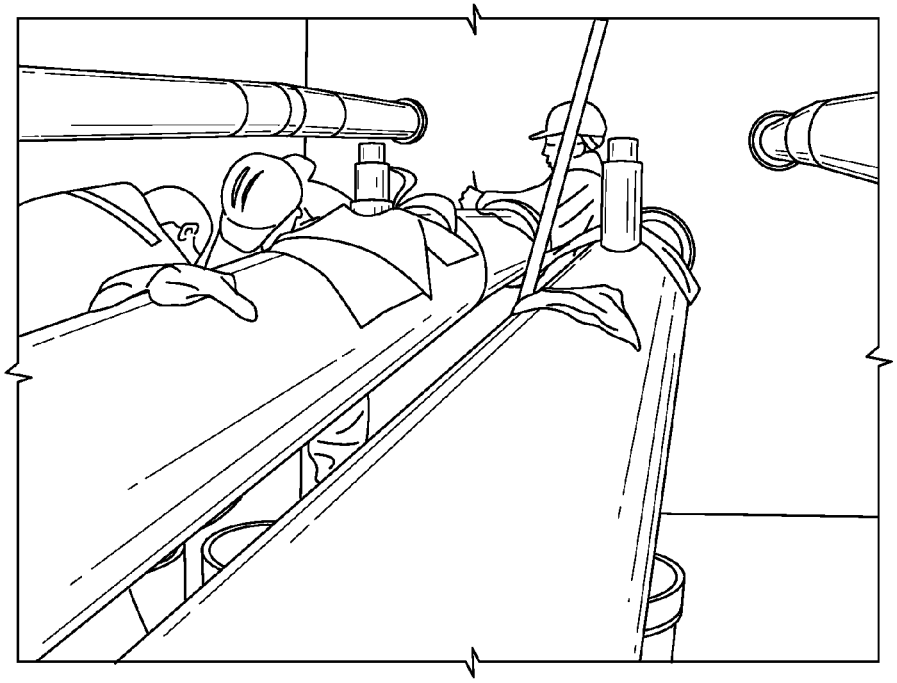
Figure 8:
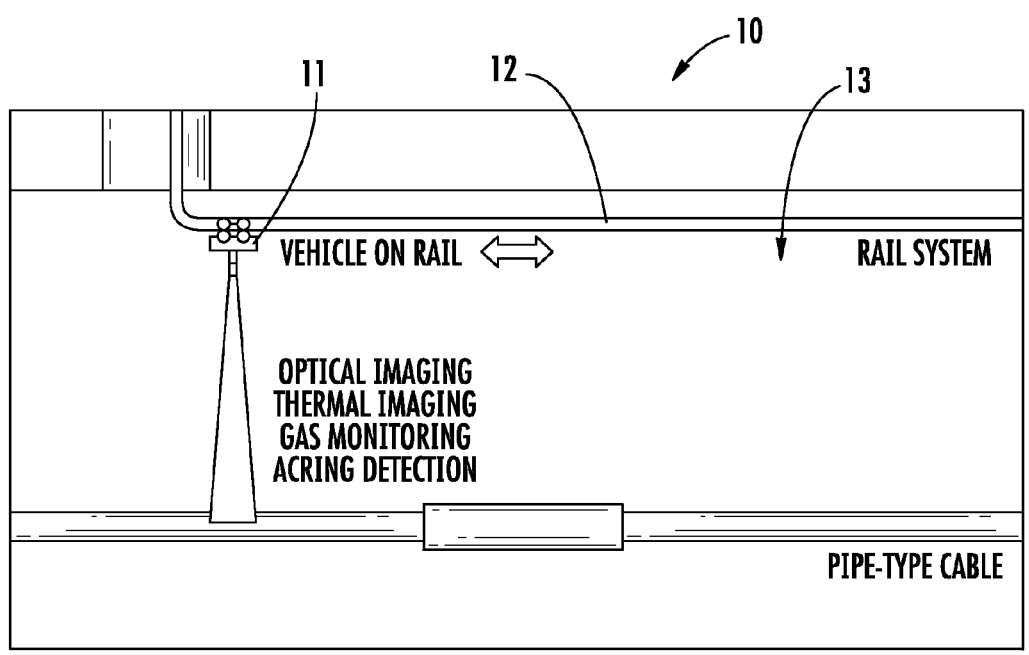
FIG. 8 shows an inspection system according to an embodiment of the invention.
Figure 9:
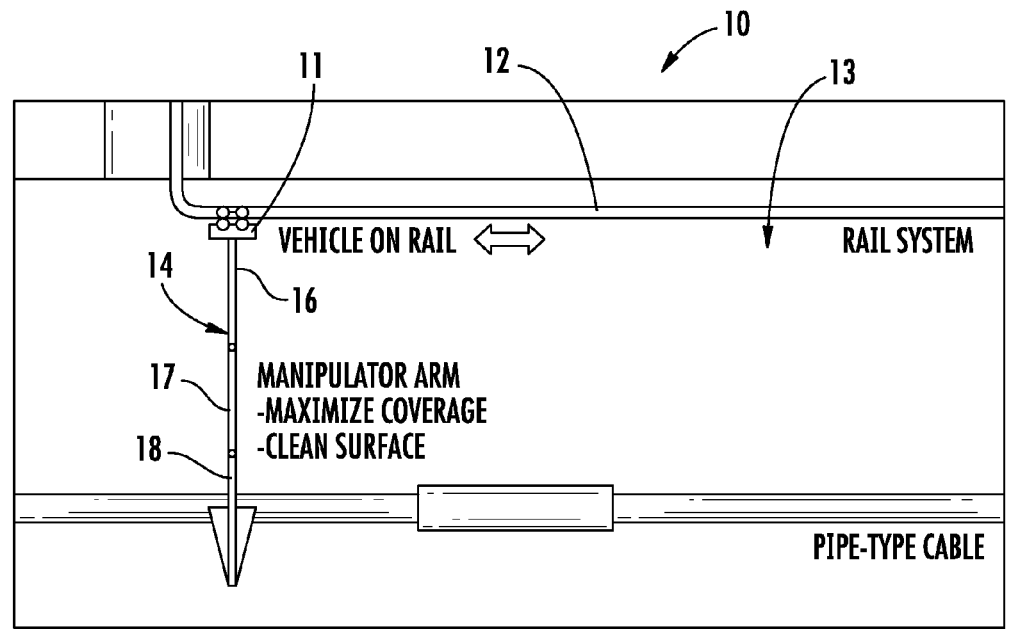
FIG. 9 shows the inspection system of FIG. 8 with a manipulator arm to perform inspection of an underground power line.
Figure 10:
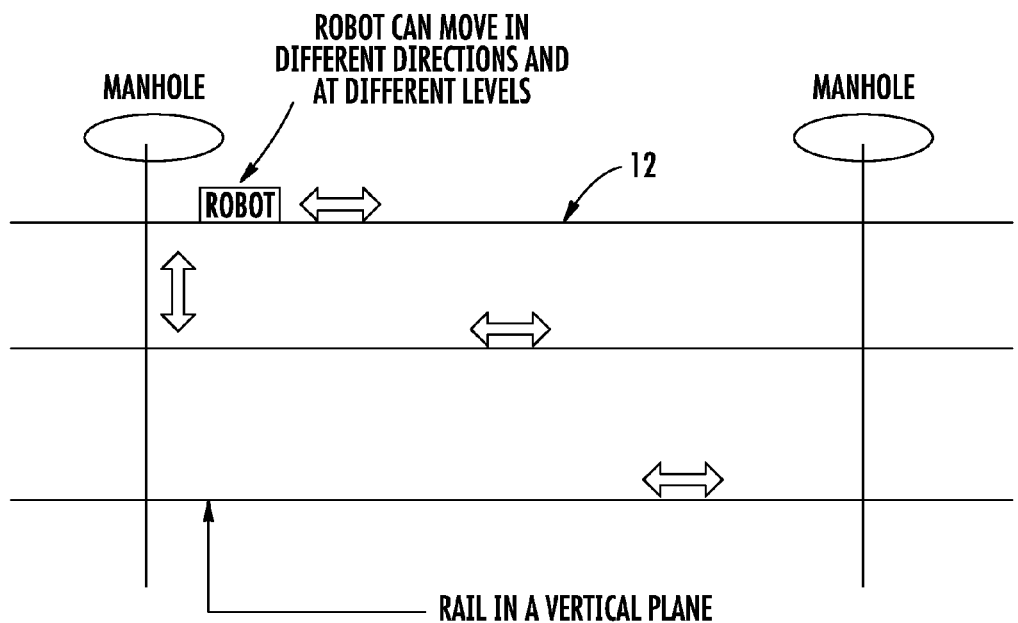
FIGS. 10-14 show rail system layouts for the system of FIG. 8.
Figure 11:
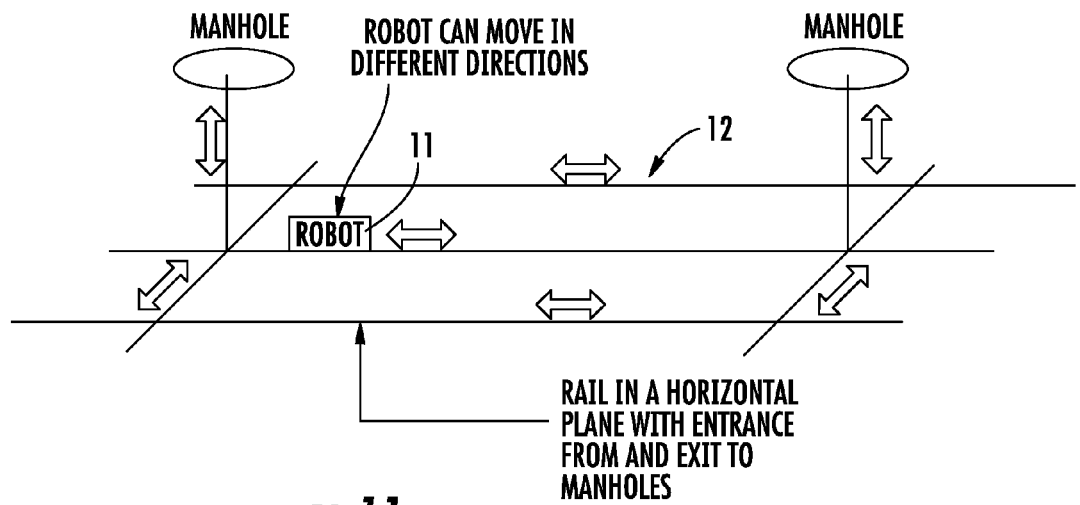
Figure 12:
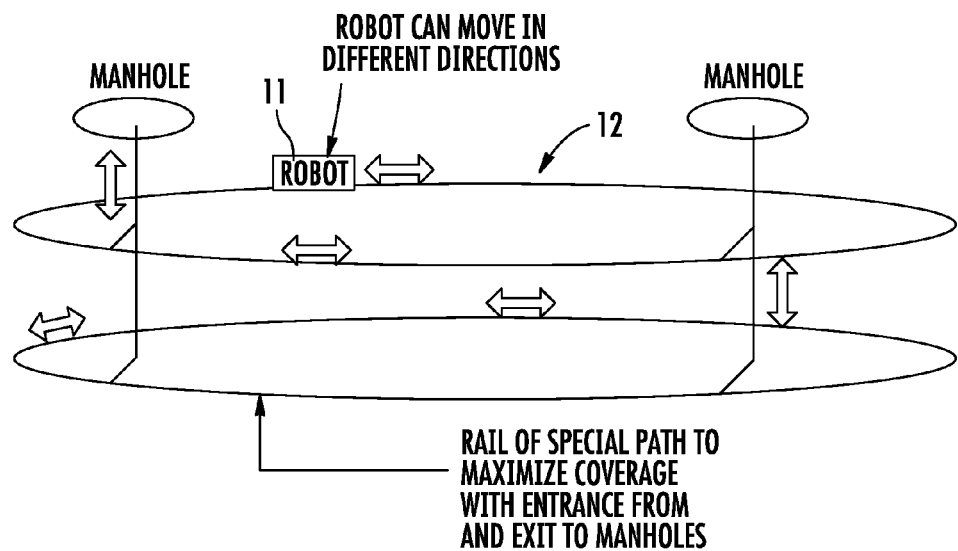
Figure 13:
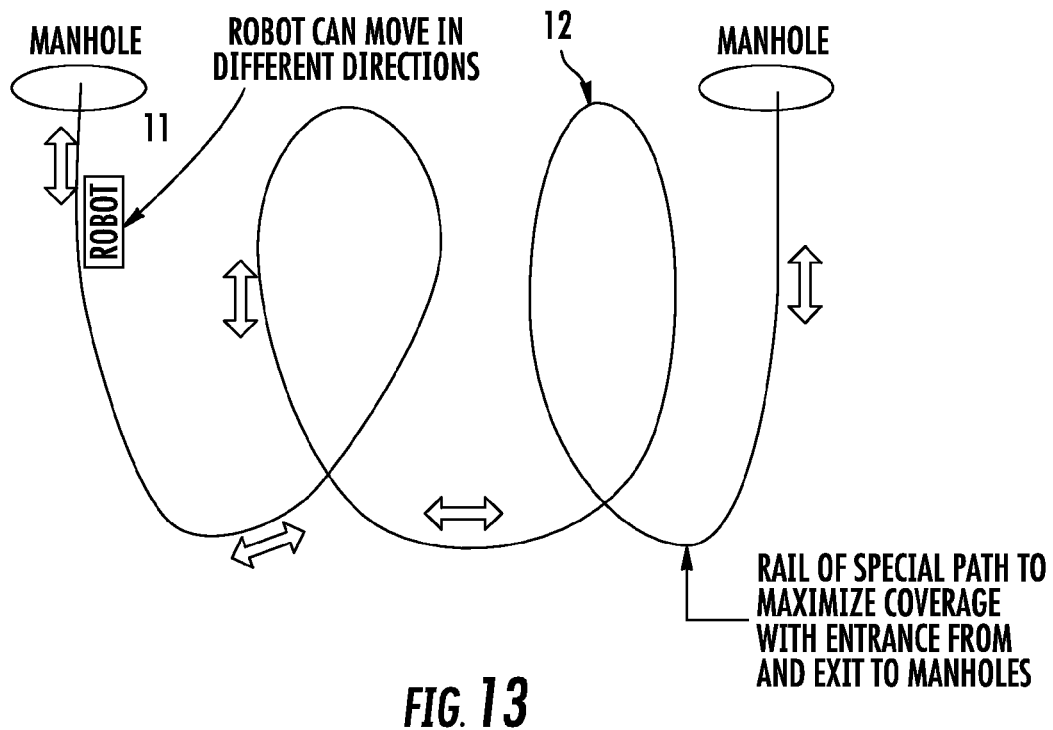
Figure 14:
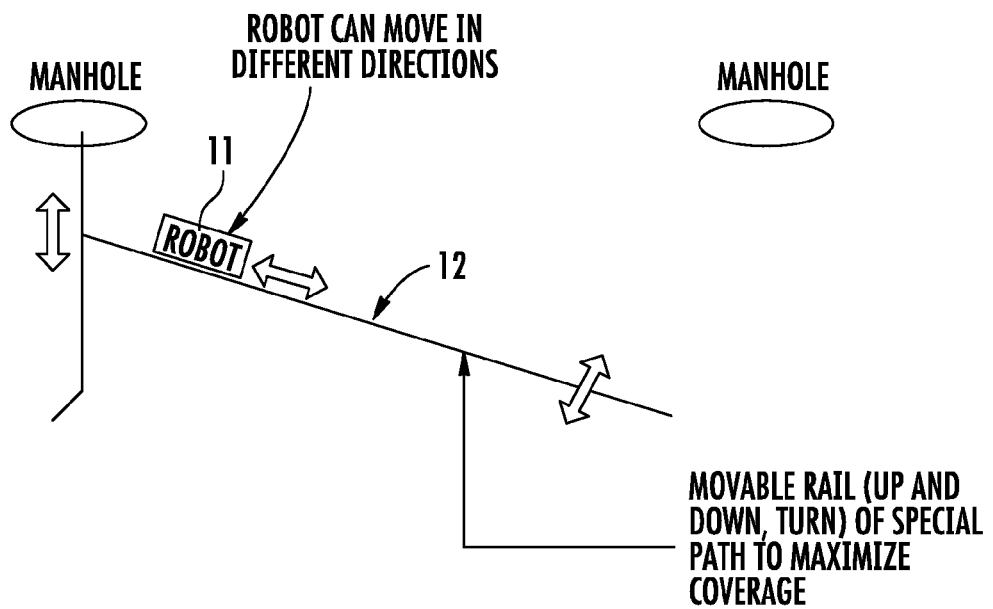

Referring to the drawings, an exemplary underground utility vault inspection system and method according to an embodiment of the invention is illustrated in FIGS. 8 and 9 and shown generally at reference numeral 10. The system 10 includes a robotic inspection vehicle 11 mounted on a railway 12 for movement through an underground vault 13 to provide inspection of utilities such as underground power lines running therethrough and any other equipment contained therein.

The vehicle 11 uses various sensors, cameras, and instruments to conduct the inspection. For example, the vehicle 11 may be equipped with optical image sensors, infrared temperature sensors, radio frequency interference sensors, acoustic sensors, hazard gas detectors, and corrosion sensors to perform visual inspection, thermal inspection, gas monitoring, and arcing detection. For optical image sensing or visual inspection, lighting may be provided on the device to assist the inspection. The area coverage of the inspection can be preprogrammed, controlled by image/object recognition, or manually controlled by the operator aboveground through real-time image monitoring. The inspection device may also be used to collect data from locally fixed sensors or data loggers (i.e., inside the vault or tunnel) as it passes by these devices. The inspection information can be processed in real-time by the inspection device itself or in a post analysis by other processing equipment.

The vehicle 11 may also be fitted with a manipulator arm 14, FIG. 9, to conduct more detailed inspections by maximizing coverage or to clean a surface of the underground power line. The manipulator arm 14 may also be used to conduct repairs such as coating repair, ground wire tightening, and link box cleaning. As shown, the manipulator arm 14 may be formed in sections 16-18 to allow the arm 14 to extend to a desired length or to allow the arm 14 to be articulated into tight areas by manipulating each of the sections 16-18 individually.

The vehicle 11, sensors, cameras, and instruments may be remotely controlled by wireless or wired technologies, wherein the wireless or wired technology operates in conjunction with or independent of the railway 12. The vehicle 11 may be powered through a battery system or a wired power supply, wherein the wired supply may or may not utilize the railway 12, or by indirect power transfer as an inductive pickup. The vehicle may be retrieved by the operator by backing off from the same railway or through a return railway.

The vehicle 11 may be permanently installed on the railway 12 to perform routine and scheduled inspections or used as a portable device to inspect components where a permanent, temporary, or retrofit railway is installed. Thus, one vehicle 11 may be used for multiple locations. The vehicle 11 may be universal for inspection of various types of vaults, tunnels, or inspections or it may be specifically designed for a specific type of inspection.

The vehicle 11 is custom fitted to travel on the railway 12. The vehicle 11 may move along the line of the railway 12 in a linear mode (i.e., parallel to the track) or in a circular motion around the axis of the railway 12 (i.e., executing a circle whose radius is perpendicular to the track). The railway 12 itself may incorporate inventive features to permit rotational as well as linear movement of the vehicle. For example, the railway 12 may have sections that are adapted to rotate (i.e., around its own axis) when the vehicle 11 enters the section. Alternatively, the railway 12 may contain embedded circumferential grooves or axial spines that guide and/or enable the vehicle 12 to accomplish a circular motion. The vehicle 11 may itself have the capability to swivel, turn, extend, telescope, or move in any suitable direction.

The railway 12 may be portable or permanently installed in underground or confined spaces so that the vehicle 11 can travel through a preprogrammed path for the inspection. The railway 12 may be a solid and fixed rail system, a flexible wire system, or a controllable flexible path that has the capability to reach a specific location. The railway 12 may consist of any number of tracks or rails, and may have switches to direct vehicle 11 travel along different routes. The railway 12 may be made of any suitable material capable of supporting the vehicle 11 to allow the vehicle 11 to carry out its intended function. The railway 12 may be specially designed and installed in new/existing vaults or tunnels, an existing system, or a retrofit to an existing structure.

As shown in FIGS. 10-14, the railway 12 may also be configured in any shape or profile and traverse multiple directions to allow proper inspection. For example, the railway 12 may be configured in a vertical plane configuration, FIG. 10, a horizontal plane configuration, FIG. 11, a specialized path configuration, FIGS. 12 and 13, a moveable rail configuration, FIG. 14, or any combination of the above to allow the vehicle to properly inspect underground power lines.

The railway 12 may also incorporate a means to power the vehicle 11. For example, the railway could include a low voltage conductor embedded in the railway 12 that provides power to an inductively coupled power pickup device on the vehicle 11. The railway 12 could also receive power from state of the art power harvesting devices inside the vault or tunnel, or from local power sources (e.g., a battery pack) and distribute that power to the vehicle 11. The railway 12 may also incorporate components of a power harvesting scheme, such as integrally providing an inductive loop or pickup for harvesting power from cable sheath currents. The railway 12 may similarly incorporate a means of routing control signals to the vehicle 11 and/or means to transmit information back to the operator. For example, the railway 12 may be used to obtain the distance, speed, and stops that the vehicle 11 travels using suitable fixed sensors or RFI devices along the track. The terminus of the railway 12 that is near the aboveground access port could also be fitted with a low power transmitter/receiver, for example, to permit easy "drive-by" communications by suitably equipped utility vehicles, or for low-power wireless mesh transmissions to nearby transmitter/receivers.

Once the railway 12 is installed in the underground vault or tunnel, the vehicle 11 is attached to the railway 12 and positioned for operation. The vehicle 11 may be pre-programmed to traverse a specific path along the railway 12 or may be controlled by wire or wirelessly to traverse the railway 12 as desired. As the vehicle 11 traverses the railway 12, the vehicle uses its many sensors and arm 14 to inspect the underground power lines. The vehicle 11 may be used to perform an inspection for a specific problem or problems or may be used to perform an overall inspection of the health of the underground power line.

The foregoing has described an underground utility vault inspection system and method. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. An underground utility vault inspection system, comprising:
   (a) a pre-defined railway installed in an underground utility vault, the railway being configured to receive an inspection vehicle mounted thereon; and
   (b) an inspection vehicle adapted to traverse the railway to provide inspection results to inspection personnel, wherein the inspection vehicle includes inspection tools for inspecting underground power lines and equipment, recording inspection results, and transmitting the inspection results to the inspection personnel.

2. The underground utility vault inspection system according to claim 1, wherein the inspection vehicle is a robot.

3. The underground utility vault inspection system according to claim 1, wherein the inspection vehicle is pre-programmed to traverse a pre-defined path of the railway.

4. The underground utility vault inspection system according to claim 1, wherein the inspection vehicle is manually controlled by the inspection personnel.

5. The underground utility vault inspection system according to claim 1, wherein the inspection vehicle includes a manipulator arm adapted to extend and be articulated into tight areas of the vault.

6. The underground utility vault inspection system according to claim 5, wherein the manipulator arm allows inspection personnel to perform inspections, clean inspection surfaces, and perform repairs.

7. The underground utility vault inspection system according to claim 1, wherein the railway is permanently installed in the vault.

8. The underground utility vault inspection system according to claim 1, wherein the railway is portable for use in inspecting utility vaults at various locations.

9. The underground utility vault inspection system according to claim 1, wherein the inspection tools are selected from the group consisting of optical imaging, thermal imaging, gas monitoring, and arcing detection.

10. A method for inspecting underground utility vaults, comprising the steps of:
    (a) providing an inspection vehicle adapted to traverse a railway disposed in an underground utility vault;
    (b) moving the inspection vehicle along the railway to a pre-determined location in the utility vault; and
    (c) using the inspection vehicle to inspect utilities located in the utility vault.

11. The method according to claim 10, further including the step of providing a railway for installation in the underground utility vault.

12. The method according to claim 10, wherein the inspection vehicle includes a manipulator arm adapted to extend and articulate to allow inspections or repairs to be conducted on utilities contained in the underground utility vault.

13. The method according to claim 12, further including the step of using the manipulator arm to inspect utilities located in the underground utility vault.

14. The method according to claim 12, further including the step of using the manipulator arm to repair utilities located in the underground utility vault.

15. The method according to claim 10, further including the step of transmitting inspection results to inspection personnel.

16. The method according to claim 10, further including the step of pre-programming the inspection vehicle to move to the pre-determined location.

* * * * *